Patented Aug. 18, 1931

1,819,079

UNITED STATES PATENT OFFICE

CHARLES S. DEWEY, OF HAMBURG, NEW YORK, ASSIGNOR TO NATIONAL ANILINE & CHEMICAL COMPANY, INC., OF NEW YORK, N. Y., A CORPORATION OF NEW YORK

TETRAKISAZO DYE

No Drawing.    Application filed June 5, 1929.    Serial No. 368,740.

This invention relates to the manufacture and production of new and valuable tetrakisazo dyestuffs which are particularly suitable for dyeing cotton and other vegetable fibres. The dyed fabrics, and other material, dyed with the new dyestuffs also form a part of the present invention.

The new tetrakisazo dyes of the present invention can be obtained by treating with carbonyl chloride the amino disazo compound having in the free state the following probable formula:

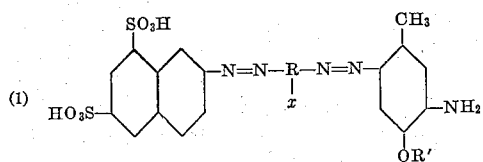

wherein R represents an aromatic radical of the benzene series, e. g., an aromatic hydrocarbon radical derived from benzene, toluene, xylene, etc., $x$ denotes a hydrogen atom or an alkoxy group, such as $-OCH_3$, $-OC_2H_5$, $-OC_3H_7$, $-OC_4H_9$, $-OC_5H_{11}$, etc., attached to the benzene nucleus, and R' stands for an alkyl group, such as $-CH_3$, $-C_2H_5$, $-C_3H_7$, $C_4H_9$, $-C_5H_{11}$, etc.

The amino disazo compounds having the above probable formula, and which are employed as intermediate bodies in the present invention, can be prepared by coupling one molecular proportion of diazotized 2-aminonaphthalene-6.8-disulphonic acid (as first component) with one molecular proportion of a primary mono amine of the benzene series having a free position para to the amino group (as second component), and diazotizing the resulting amino monazo dyestuff and coupling it with one molecular proportion of 4-methyl-2-amino-1-alkoxybenzene (as third component). The amino disazo compounds of dyestuffs thus obtained are subsequently treated with carbonyl chloride to produce symmetrical diarylurea compounds which comprise the new tetrakisazo dyestuffs of the present invention.

The new tetrakisazo dyestuffs are salts, particularly alkali-metal salts, of an acid which has in the free state the following probable formula:

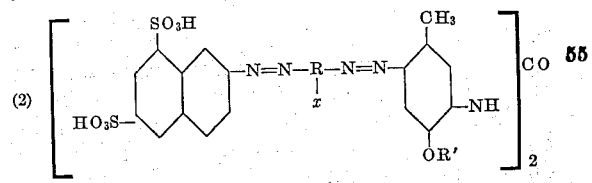

wherein R, $x$ and R' stand for the same atoms, groups and radicals as represented in Formula (1).

The new dyestuffs in the dried and pulverized state and in the form of their sodium salts, are powders soluble in water giving in general red to brown solutions, and soluble in concentrated sulfuric acid with a blue to green color. Upon reduction with stannous chloride and hydrochloric acid, they yield 2-amino naphthalene-6.8-disulfonic acid, a para-diamine of the benzene series, and a 3.3'-dimethyl-4.4'-diamino-6.6'-dialkoxydiphenylurea which may be further decomposed into carbonic acid and a 1.4-diamino-3-methyl-6-alkoxyl-benzene. They dye cotton from a neutral bath red to brown shades which are capable of being discharged by the action of reducing agents, e. g., sodium hydrosulfite.

The following example will further illustrate the invention, but it is understood that the invention is not limited thereto.

Example: 75.2 parts of the sodium salt of the aminoazo compound which can be obtained by coupling diazotized 2-naphthylamine-6.8-disulfonic acid (1 mol) with the formaldehyde-bisulfite compound of aniline (1 mol) and subsequently eliminating the formaldehyde-bisulfite group, and which has the following probable formula:

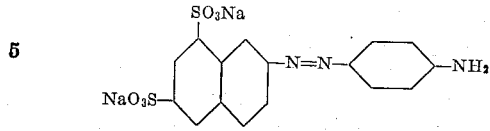

are dissolved in 360 parts water, sufficient hydrochloric acid, sp. gr. 1.16, is added to the solution until it shows no alkalinity toward brilliant yellow test paper and no acidity toward Congo red paper, and then 12 parts of sodium nitrite are dissolved therein. This solution is diazotized by slowly adding it to a well-stirred solution of 67 parts hydrochloric acid, sp. gr. 1.16, and 133 parts common salt dissolved in 360 parts water containing 320 parts ice. The temperature should not be allowed to rise above 10°–12° C., and at the completion of the diazotization no excess of nitrous acid should be present. Any excess of nitrous acid which may be present can be eliminated by the addition of a small amount of the initial monazo dyestuff which may have been reserved for that purpose. To the resulting diazo solution, cooled to 7°–8° C. by addition of ice, if necessary, there is added with string, 22.3 parts of cresidine (i. e. 4-methyl-2-amino-1-methoxybenzene) previously dissolved in 120 parts water and 19.8 parts hydrochloric acid, sp. gr. 1.16. After stirring for awhile, the coupling is completed by the addition of 42 parts of sodium acetate, and further stirring. The volume should be about 2000 parts. When the coupling is completed, the solution is heated to 50°–60° C., sufficient caustic soda liquor is added to make the solution alkaline to brilliant yellow paper and the dyestuff is salted out by the addition of lime-free common salt, and is filtered off, pressed, and, if desired, dried. The amino disazo dye thus obtained has the following probable formula:

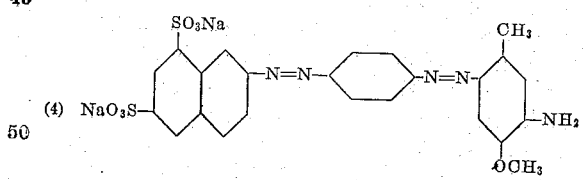

24 parts of the amino disazo dye thus obtained are dissolved in 700 parts of water, and into the well stirred solution, which is at a temperature of about 70° C., carbonyl chloride is introduced until the production of the urea is complete, the solution being kept alkaline to brilliant yellow test paper throughout the reaction by the addition thereto from time to time of a strong solution of sodium carbonate. The reaction is complete when a diluted sample spotted on filter paper shows no, or very little, violet coloration when treated with dilute hydrochloric acid. When the reaction is complete, the reaction mixture is heated to a temperature of 90° C. and the dyestuff precipitated by the addition of lime-free common salt. After cooling to 35° C., the precipitated dye is filtered, pressed, and dried. The new dyestuff thus obtained is the sodium salt of an acid having the following probable formula:

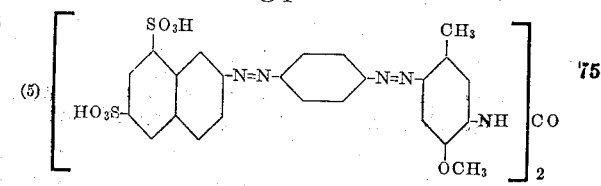

and in the dried and pulverized state in the form of its sodium salt is a reddish brown powder, soluble in water giving a reddish brown solution, soluble in concentrated sulfuric acid giving a greenish blue solution. From a neutral bath, it dyes cotton reddish brown shades which are of excellent fastness to light, which are capable of being discharged by the action of sodium hydrosulfite. It also dyes rayon similar shades but has little, if any, affinity for acetyl-silk.

Other valuable new tetrakisazo dyes are obtainable in an analogous manner by the action of carbonyl chloride on other amino disazo compounds, for example, such as are obtainable from 2-aminonaphthalene-6.8-disulfonic acid as first component, and ortho-toluidine, meta-toluidine, para-xylidine, a methyl, ethyl, propyl, isopropyl, butyl, isobutyl, etc., ether of ortho-amino phenol or of meta-amino phenol or of ortho-amino-para-cresol, and the same or other primary amines of the benzene series having a free position para to the amino group, particularly those which are free from nuclear substituents other than an alkyl and/or an alkoxy group, as second component, and a methyl, ethyl, propyl, isopropyl, butyl, isobutyl, secondary butyl, amyl, or other alkyl ether of ortho-amino-para-cresol as third component. While the preparation of the aminoazo compounds can generally be effected by the direct combination of the diazotized 2-aminonaphthalene-6.8-disulfonic acid with the primary amines of the benzene series having a free para position, yet in some cases it is advantageous to proceed by way of the formaldehyde-bisulfite compound of the amine, as for example, when coupling into aniline, o-toluidine, or the alkyl ethers of o-aminophenol, and subsequently eliminating the formaldehyde-bisulfite group in any suitable way or well known manner.

According to the present invention, it will be understood that the new tetrakisazo dyes include the same in the form of their normal salts, their acids, or their acid-salts.

I claim:

1. As new products, tetrakisazo dyestuffs having in the free state the following probable formula:

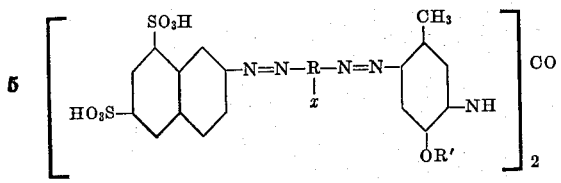

wherein R represents an aromatic radical of the benzene series, $x$ denotes a hydrogen atom or an alkoxy group, and R′ stands for an alkyl group, said dyestuffs in the dry and pulverized state in the form of their alkali metal salts being powders soluble in water and in concentrated sulfuric acid, and dyeing cotton from a neutral bath red to brown tints which are capable of being discharged by the action of sodium hydrosulfite.

2. As new products, tetrakisazo dyestuffs having in the free state the following probable formula:

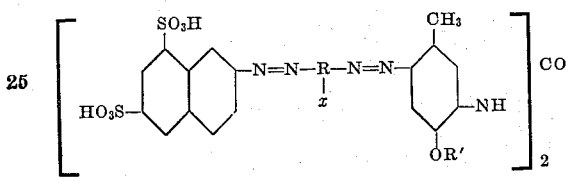

wherein R represents an aromatic hydrocarbon radical of the benzene series, $x$ denotes a hydrogen atom or an alkoxy group, and R′ stands for an alkyl group, said dyestuffs in the dry state in the form of their sodium salts being soluble in water and in concentrated sulfuric acid, and from a neutral bath dyeing cotton red to brown shades which are capable of being discharged by the action of sodium hydrosulfite.

3. As a new product, the tetrakisazo dyestuff having in the free state the following probable formula:

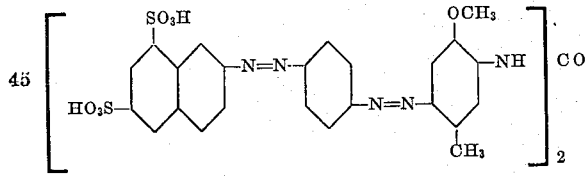

which in the dry state in the form of its sodium salt is a reddish brown powder soluble in water and in concentrated sulfuric acid, and which from a neutral bath dyes cotton reddish brown shades which are capable of being discharged by the action of sodium hydrosulfite.

4. Material dyed with a dyestuff of claim 1.
5. Material dyed with a dyestuff of claim 2.
6. Material dyed with a dyestuff of claim 3.

In testimony whereof I affix my signature.

CHARLES S. DEWEY.